United States Patent [19]

Noorlander

[11] Patent Number: 4,459,938

[45] Date of Patent: Jul. 17, 1984

[54] TEAT CUP ASSEMBLY

[76] Inventor: Daniel O. Noorlander, 508 W. 630 South, Orem, Utah 84057

[21] Appl. No.: 391,168

[22] Filed: Jun. 23, 1982

[51] Int. Cl.$^3$ .............................................. A01J 5/04
[52] U.S. Cl. ................................................. 119/14.49
[58] Field of Search .............. 119/14.47, 14.48, 14.49, 119/14.50, 14.51, 14.52, 14.53

[56] References Cited

U.S. PATENT DOCUMENTS

| | | | |
|---|---|---|---|
| 827,159 | 7/1906 | Lane | 119/14.49 |
| 2,484,696 | 10/1949 | Dinesen | 119/14.53 |
| 4,269,143 | 5/1981 | Erbach | 119/14.49 |

Primary Examiner—Hugh R. Chamblee
Attorney, Agent, or Firm—Terry M. Crellin

[57] ABSTRACT

A teat cup assembly for automatic milking machines employing a vacuum milk line and a pulsating vacuum line is disclosed. The assembly comprises a rigid, tubular shell and an elongate, tubular, inflation member received longitudinally within the shell. A sheet of metal is wrapped around the shell, and an elongate sleeve member is adapted to fit telescopically over the sheet of metal which is wrapped about the shell. The lead end of the elongate member makes a tight fit with a raised band on said shell, so that the sheet of metal is sealed between the shell and the sleeve member. A cap member fits over the other end of the shell. Teat entrance means are provided at one of the opposite ends of the inflation for receiving a teat of an animal to be milked, and means are provided adjacent to the other end of the inflation for connecting the vacuum milk line in flow communication with the inflation. A port is provided in the shell for connection to the pulsating vacuum line.

16 Claims, 6 Drawing Figures

TEAT CUP ASSEMBLY

BACKGROUND OF THE INVENTION

1. Field

The invention relates to improved teat cup assemblies in vacuum operated, automatic milking machines.

2. State of the Art

Convention automatic milking machines utilize teat cup assemblies including a hollow, rigid outer shell or cup having a port which is adapted to be attached to a pulsating vacuum line, and a resilient, tubular liner or inflation extending longitudinally of the shell or cup. The ends of the inflation make sealing engagement with the shell to form an annular vacuum chamber between the shell and the inflation. The pressure in the annular chamber is alternated between subatmospheric pressure and a higher pressure, typically atmospheric, by the pulsating vacuum line attached to the shell. A constant vacuum line is connected to the lower end of the inflation to draw milk from the cow's teat which is received in the upper end of the inflation. The interior of the inflation is, thus, maintained at a constant subatmospheric pressure, and the alternating pressure in the annular chamber periodically forces the walls of the inflation inwardly resulting in a massaging action on the teat as well as collapsing the walls of the inflation below the teat which periodically relieves the teat from exposure to the vacuum in the constant vacuum line.

It is important that the upper portion of the inflation grips the teat firmly to prevent vacuum loss and disengagement of the teat cup from the teat, as well as to prevent the teat cups from moving higher up on the teats during the puslations of the milking machines, which can ultimately result in constriction of the teat and premature shut off of milk from the udder even though the under is only partially emptied. The teats of different cows vary considerably in their diameter and length. Changes in teat sizes also occur during the milking. These variations and changes make it very difficult to produce teat cups which can be used in milking a number of cows. In my prior U.S. Pat. No. 3,308,788 there is disclosed a teat cup assembly in which a resilient disk element is mounted on top of the teat cup in position to engage the cow's teat and resiliently retain the cup from falling off the teat. Unfortunately, the teat cup assembly was relatively expensive both to manufacture and to maintain because of the number of individual components in the assembly. In other of my prior art patents, i.e., U.S. Pat. Nos. 3,659,557 and 3,096,740, teat cup assemblies are provided in which the inflation is molded so as to integrally incorporate a diaphragm and an elastic means therein. Other inflations which are molded so as to incorporate a resilient retaining element integrally therein are disclosed in U.S. Pat. Nos. 2,744,496; 3,771,494 and 3,873,521.

In a later patent of mine, U.S. Pat. No. 4,315,480 an improved teat cup assembly is disclosed in which an inflation and a separately molded teat entrance member are made of silicone rubber which is not subject to deterioration due to soil, fat, ozone, etc., and which has been found to have a much greater life than assemblies made with molded rubber inflations. A shell and a protective cap means were provided to protect the silicone rubber parts from puncture-type damage to which silicone rubber is particularly vulnerable. The shell was disclosed as being made of either a rigid synthetic resin or plastic material or of a suitable metal such as stainless steel. Unfortunately, however, when the shell is made of a synthetic resin or plastic, the teat cup assembly is relatively light in weight and does not provide as great a downward tension on the teats of the animal being milked as is provided when the shell is made of metal. Stainless steel shells are considerably more expensive than those made of resin or plastic material, and it is desirable to provide a teat cup assembly which can be made of the more inexpensive materials.

3. Objectives

A principal objective of the present invention is to provide an improvement in teat cup assemblies of the type disclosed in U.S. Pat. No. 4,315,480 which utilize an inflation and teat engaging diaphragm made of a resilient, elastomeric material such as silicone rubber, with a protective cap member provided for securing the diaphragm portion to the teat assembly. A particular objective of this invention is to provide such a teat cup assembly in which the shell is made of rigid synthetic polymers or plastic material and means are provided for adding weight to the assembly by wrapping a sheet of heavy metal such as lead about the outer periphery of the shell, with the metal sheet being sealed between the shell and an elongate sleeve member which fits telescopically over the shell and metal sheet. An additional objective of this invention is to provide novel sealing means at the ends of the shell where the respective ends of the inflation are expanded and turned back over the ends of the shell so as to isolate the crevice formed between the turned back ends of the inflation and the shell from contact with milk within the inflation, thereby eliminating the potential habitat for bacterial growth within the crevice. An even further objective of the invention is to provide a cap member for connecting a vacuum milk line in flow communication with the inflation, wherein the cap member comprises an enlarged chamber adjacent the lower end of the inflation so as to minimize the effect of unstable pressure variations from the milk line on the teats of the animal being milked.

SUMMARY OF THE INVENTION

The above objectives are achieved in accordance with the present invention by forming a novel, improved teat cup assembly utilizing a molded diaphragm member and an inflation made of extruded, tubular elastomeric material. Preferably both the diaphragm member and the inflation are formed from silicone rubber. Using extruded material in the inflation reduces the costs of the teat cup assemblies even when more expensive elastomeric material such as silicone rubber is used.

The teat cup assembly includes a rigid, tubular shell molded from a rigid polymeric or plastic material. The shell has a raised band which is spaced between the ends of the shell and which encircles the outer circumference of the shell. A port is provided through the raised band and shell, with the port being adapted to be connected to a source of pulsating vacuum. An elongate tubular inflation is received longitudinally within the shell. Means are provided for sealing the end portions of the inflation to the opposite ends of the shell, whereby a pulsating vacuum chamber is defined between the inflation and the shell. In a preferred embodiment of the invention, the inflation is of a sufficient length to extend beyond the opposite end of the shell, with the opposite end portions of the inflations being expanded and turned back over the respective ends of the shell.

A sheet of metal, preferably a heavy ductile metal such as lead, is formed to wrap around and conform closely to the outer surface of the shell. The sheet of metal is positioned between the raised band and one end portion of the shell. The raised band is preferably spaced closer to one of the open ends of the shell than to the other, and the sheet of metal is then placed around the periphery of the shell between the raised band and the open end of the shell most remote from the raised band.

An elongate sleeve member is received in sliding telescopic manner over the shell and the sheet of metal, with the leading end of the sleeve being adapted to make a tight, compression fit over the periphery of at least the end portion of the raised band. Means are provided for sealing the other end portion of the sleeve to the shell adjacent to the one open end thereof. In the preferred embodiment of the invention in which the ends of the inflation are turned back over the open ends of the shell, the other end portion of the sleeve is adapted to fit securely over the end portion of the tubular inflation which is turned back over the one open end of the shell so that the end portion of the inflation is sealed tightly between the sleeve member and the shell. This also seals the sheet of metal within the space between the shell and the sleeve member, inasmuch as the one end of that space is sealed by the turned back portion of the inflation and the other end is sealed by the compression fit of the leading end of the sleeve with the raised band on the shell.

A cap member is provided to seal the other end portion of the tubular inflation member to the second open end of the shell. In the preferred embodiment of the invention, the cap member is fit securely over the other end portion of the tubular inflation member which is turned back over the second open end of the shell, and the other end portion of the inflation is sealed tightly between the cap member and the shell.

Teat entrance means are provided adjacent to one of the opposite end portions of the inflation for receiving a teat of an animal to be milked within the inflation. Adjacent to the other end portion of the inflation there is provided means for connecting a vacuum milk line in flow communication with the inflation.

Additional objects and features of the invention will become apparent from the following detailed description, taken together with the accompanying drawings.

THE DRAWINGS

A preferred embodiment of the present invention representing the best mode presently contemplated of carrying out the invention is illustrated in the accompanying drawings, in which.

DETAILED DESCRIPTION OF THE ILLUSTRATED EMBODIMENTS

Figure 1:
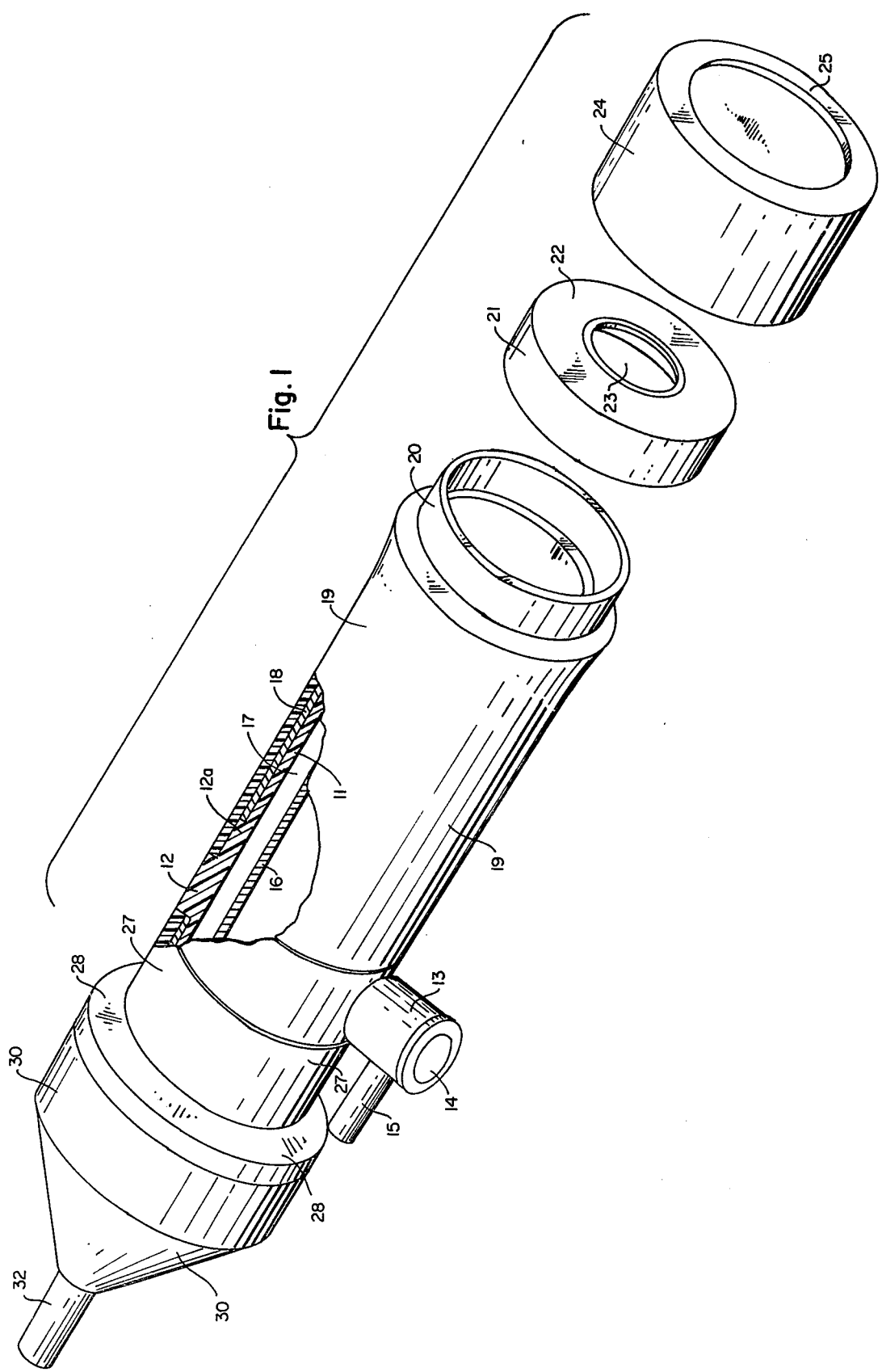
FIG. 1 is a pictorial view of a teat cup assembly in accordance with the invention, with the teat entrance member and its associated cylindrical securement member shown in exploded relationship to the remaining assembly, and with the assembly being broken away to show further detail.

A teat cup assembly incorporating the preferred embodiments in accordance with the present invention is shown in the drawings. As illustrated, the teat cup assembly has a rigid, tubular shell 11 molded from a rigid synthetic resin or plastic material, such as nylon, acrylic, methacrylic, polyvinyl chloride, polycarbonate, polyethylene, polypropylene, acrylonitrile, styrene, or polysulfone among others.

Figure 4:
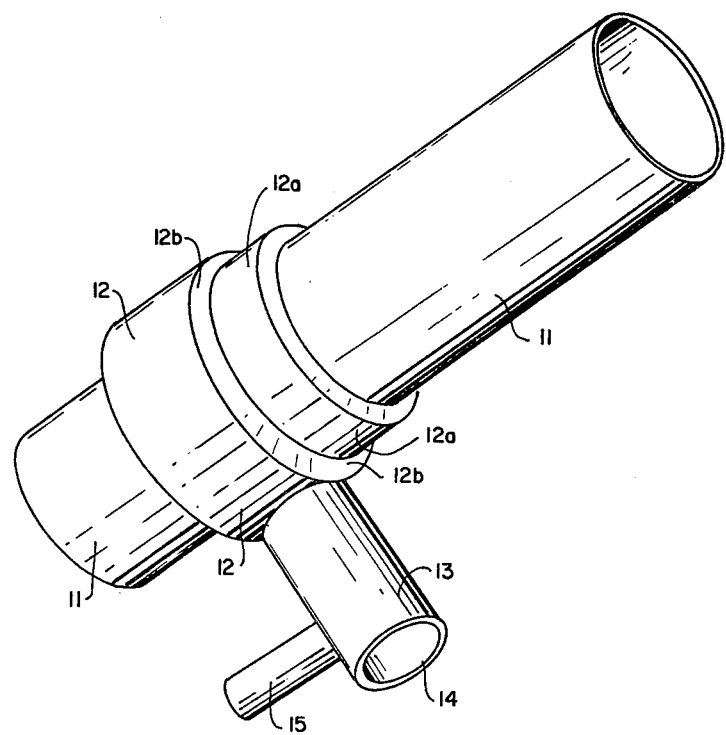
FIG. 4 is a pictorial view of the shell member of the unit of FIG. 1.

The tubular shell 11 is shown in all the drawings, but in FIG. 4 it is shown pictorially in isolation from the other components of the teat cup assembly. The tubular shell 11 has a raised band 12 spaced along the longitudinal length of the shell 11 from at least one of the open ends of the shell 11. In the preferred embodiment as shown in the drawings, the raised band 12 is spaced between the opposite open ends of the shell 11, so that the raised band 12 is closer to one of the open ends of the shell than the other. For purposes of simplicity in describing the apparatus, the end of the shell 11 most remote from the raised band 12 shall be referred to as the first end or first open end of the shell 11 and the other end shall be referred to as the second end or second open end of the shell 11. The raised band 12 is preferably made of the same plastic material as the shell 11 and is preferably integrally molded with the shell 11.

In the preferred embodiment, as illustrated, the raised band is formed with one portion thereof having a greater thickness than the other end portion thereof. In the drawings the end portion having the smaller thickness is identified by the reference numeral 12a. A protruding abutment 12b (FIG. 4) is thus formed encircling the raised band 12 and separating the respective end portions of the raised band 12. As mentioned above, the raised band 12 is positioned along the longitudinal length of the shell 11 between the open ends of the shell 11 so as to be spaced closer to the second open end than the first open end. Further, the end portion of the raised band 12 having the greater thickness is more remote from the first open end of the shell 11 than the other end portion which has the smaller thickness. Thus, the protruding abutment 12b faces toward the first open end of the shell 11.

The shell further has a port therein extending through the raised band, with the port being adapted to be connected to a source of pulsating vacuum. As illustrated, the port comprises a cylindrical extension 13 projecting radially outwardly from the raised band 12 of the shell 11. The extension 13 is hollow and the hollow bore extends through the raised band 12 to the interior of the shell 11. A cap 14 is provided for closing the otherwise free, open end of the extension 13. A cylindrical nipple 15 extends from the side of the extension 13 so as to be substantially normal to the longitudinal axis of the extension 13. The nipple 15 is hollow, and the hollow bore extends through the sidewall of the extension 13 to the hollow interior of the extension 13. The nipple 15 is adapted to have a hose or tubing attaching thereto which is, in turn, in flow communication with a source of pulsating vacuum.

Figure 3:
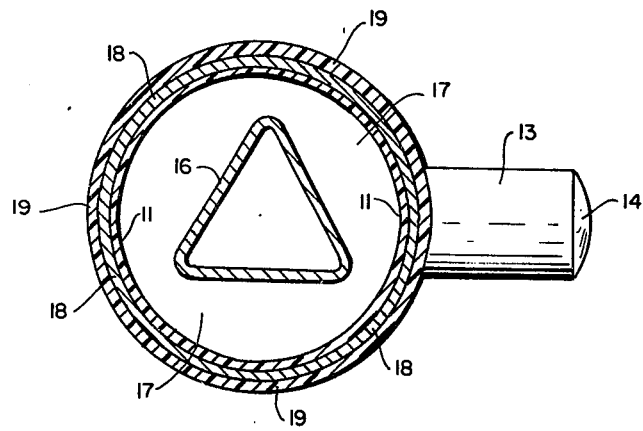
FIG. 3 is a transverse, cross-sectional view taken along line 3—3 of FIG. 2.

An elongate, tubular inflation 16 is adapted to be received longitudinally within the shell 11. The tubular inflation 16 is formed from a resilient, flexible elastomeric material, preferably silicone rubber. Silicone rubber inflations are preferred inasmuch as they have much greater useful life than inflations made of rubber or other elastomeric materials. However, the invention is not to be restricted to any particular material from which the inflation 16 is made. The tubular inflation 16 preferably comprises an extruded piece of material. The cross-sectional shape of the extruded material can be of various shapes, such as round, oval, or multisided. Preferably, the inflation 16 has a generally triangular cross section as shown in FIG. 3, wherein the corners of the triangular shape are rounded and the sides of the triangular shape are equal in cross-sectional length. Typically, the inflation 16 is made of extruded, tubular pieces having a wall thickness of about 1.5 to 3 millimeters, with the triangular sides being about 2 to 3 centimeters in cross-sectional length. A particular embodiment of the inflation 16 which has been found to be acceptable with various cows from different breeds comprises a tubular member made of silicone rubber having a triangular cross-sectional shape, with the three sides of equal in cross-sectional length of about 2.5 centimeters and having a wall thickness of about 2 millimeters.

The inflation 16 is of sufficient longitudinal length to extend beyond the ends of the shell 11. The opposite end portions of the inflation 16 are expanded into substantially circular configuration and turned back over the respective ends of the shell 11, whereby a pulsating vacuum chamber 17 is defined between the sides of the inflation 16 and the shell 11. As can be seen, the pulsating vacuum chamber 17 is in flow communication with the source of pulsating vacuum through the port (comprising the extension 13 and nipple 15) on the shell 11 and the hose or tubing (not shown in drawings) attached between the port and the source of pulsating vacuum. For purposes of simplicity in discussing the embodiment of the invention as illustrated in the drawings, the end portion of the tubular inflation 16 which is turned back over the first open end of the shell 11 shall be referred to as the one end portion of the inflation 16 and that one end portion will be given the reference numeral 16a in the drawings. The end portion of the inflation 16 which is turned back over the second open end of the shell 11 shall be referred to as the other end portion of the inflation 16 and that other end portion will be given the reference numeral 16b in the drawings.

A sheet of metal 18 is formed to wrap around and conform closely to the outer surface of the shell 11 between the raised band 12 and the one end portion 16a of the inflation member 16 which is turned back over the first open end of the shell 11. The sheet of metal 18 has a thickness which is no greater than the thickness of the sidewall of the tubular inflation member 16. The metal is adapted to provide weight to the teat cup assembly and is, thus, preferably made of a heavy metal such as lead and lead alloys. The sheet of metal 18 made of lead and lead alloys is generally very ductile and can be easily formed about the surface of the shell 11.

An elongate sleeve member 19 is adapted to slide over the shell 11 and the sheet of metal 18 in telescopic manner. As illustrated, the shell 11 is circular in cross section, and, thus, the sheet of metal will also be circular. The elongate sleeve 19 has a circular cross section and is adapted to slide over the shell 11 and sheet of metal 18 in coaxial arrangement. It should be noted, however, that the shell 11 could have a cross-sectional shape other than circular. In such instances, the sheet of metal 18 would be formed to conform to the shape of the shell 11, and the elongate sleeve 19 would have a cross-sectional shape (at least its internal surface) the same as the shell but being enlarged sufficiently that the sleeve could slide over the shell 11 and sheet of metal 18. Actually, the inner dimensions of the sleeve 19 must be sufficient to slide over the one end portion 16a of the inflation which is turned back over the first end of the shell 11. Advantageously, the sheet of metal 18 has a thickness no greater than the thickness of the sidewall of the inflation 16 so that when the elongate sleeve 19 slides over the turned back portion of the inflation 16, it will also slide readily over the sheet of metal 18.

The leading end of the elongate sleeve 19 is adapted to make a tight compression fit over the periphery of at least the end portion of the raised band 12 as the elongate sleeve 19 is moved into place over the shell 11 and sheet of metal 18. In the preferred embodiment illustrated in the drawings, the smaller end portion 12a of the raised band 12 faces the end of the shell 11 over which the elongate sleeve 19 is fit, and the leading end of the sleeve member 19 makes a tight, compression fit over the circumference of the smaller end portion 12a of the raised band 12, with the end of the sleeve 19 positioned adjacent to or abutting the protruding abutment 12b of the raised band 12.

The other end of the elongate sleeve 19 is adapted to fit securely over and firmly engage the one end portion 16a of the tubular inflation 16 which is turned back over the first open end of the shell 11, so that the one end portion 16a of the inflation 16 is sealed and held tightly between the sleeve member 19 and the shell 11. To achieve a positive, firm engagement of said other end portion of the sleeve 19 with the one end portion 16a of the inflation 16, and to firmly seal the one end portion 16a between the sleeve 19 and the shell 11, a slight taper is preferably provided to the inside surface of said other end portion of the sleeve 19, so that the internal cross-sectional dimension of said other end portion of the sleeve 19 gradually decreases in the area of contact between the sleeve 19 and the one end portion 16a of the inflation in the direction of the open end of said other end portion of the sleeve 19. Thus, as said other end portion of the sleeve 19 advances into sliding contact with the one end portion 16a of the inflation 16, the one end portion 16a of the inflation 16 is gradually compressed between the shell 11 and the tapered portion of sleeve 19.

The sleeve member 19 is preferably molded from one of the plastic materials mentioned hereinbefore from which the shell 11 can be made. Advantageously, the shell 11 and the sleeve member 19 are molded from the same plastic material.

The sheet of metal 18 is completely encapsulated between the shell 11 and the sleeve 19, with one end of the space in which the sheet of metal is encapsulated being sealed by the engagement of the leading end of the sleeve 19 with the raised band 12, and the other end of the space being sealed by the sealing of the turned back end portion 16a of the inflation between the shell 11 and the sleeve 19. Thus, the sheet of metal 18 is positively isolated from contact with anything outside the sealed space in which it is encapsulated. In particular, there is no chance of milk coming into contact with the sheet of metal during use of the teat cup assembly.

Teat entrance means are provided adjacent to either one or the other end portions of the inflation 16, and means are provided adjacent to the opposite end of the inflation 16 for connecting a vacuum milk line in flow communication with the inflation 16. In the preferred embodiment of the invention, as illustrated in the drawings, the teat entrance means is associated with the trailing end portion of the sleeve 19, and the means for connecting the vacuum milk line to the inflation is associated with the opposite end of the inflation 16. However, it should be recognized that the elongate body portions of the teat cup assembly shown in the drawings could in essence be turned end-for-end with respect to the teat entrance means and the means for connecting the vacuum milk line to the inflation. In such an alternate embodiment (not illustrated) the means for connecting the vacuum milk line would be associated with the trailing end portion of the sleeve 19, the teat entrance means would be associated with the other end of the inflation, and as a practical matter, the nipple 15 on the extension 13 from the raised band 12 would extend in a direction opposite that shown in the drawings, i.e., it would extend toward the end of the inflation associated with the sleeve member 19.

In the preferred embodiment as illustrated in the drawings, the teat entrance means comprises a cylindrical extension 20 which is made of the same plastic material as the sleeve member 19 and is molded integrally to the trailing end portion of the sleeve member 19. The cylindrical extension 20 extends coaxially outwardly from the end of the sleeve member 19 and, thus, coaxially outwardly from the first open end of the shell 11 when the sleeve 19 is in its telescoped position over the shell 11.

A cup-like, teat entrance member made of a resilient, flexible, elastomeric material is adapted to fit over the cylindrical extension 20 of the sleeve member 19. The teat entrance member comprises a substantially cylindrical side section 21 which is adapted to fit over the upwardly extending portion 20 of the sleeve member 19. A diaphragm 22 is molded integrally to one end of the cylindrical side section 21 of the teat entrance member so that when the cylindrical side section 21 is positioned on the extension 20 from the sleeve member 19, the diaphragm 22 extends across the open end of the sleeve member 19. A central opening 23 is provided in the diaphragm 22 for reception of an animal's teat. The central opening 23 has a substantially circular shape and is substantially coaxial with the longitudinal axis of the inflation 16. The circumference of the opening 23 is preferably smaller than the cross-sectional circumference of the unexpanded portion of the inflation 16 as taught in my prior U.S. Pat. No. 4,315,480, the entire contents of which are incorporated hereby by reference. The teat entrance member is preferably molded of silicone rubber.

A substantially cylindrical, securement member 24 (FIGS. 1 and 2) is adapted to slide tightly over the cylindrical side section 21 of the teat entrance member and the upper portion of the sleeve member 19 to securely hold the teat entrance member in place and to provide protection for the elastomeric teat entrance member. The securement member is preferably made of a tough, resilient, elastomeric, plastic material of sufficient thickness to provide a protective cover for the cylindrical side section 21 of the teat entrance member and to fit tightly over the teat entrance member and sleeve member 19. A flange or lip 25 is advantageously provided around the perimeter of the upper end of the securement member 24. As illustrated, the lip 25 extends inwardly from the outer end of the securement member 24 so as to form a seat upon which the outer perimeter of the diaphragm 22 of the teat entrance member abuts when the securement member 24 is placed in position over the teat entrance member and sleeve. The lip 25 provides added protection for the diaphragm 22.

The upper portion of the sleeve member 19 is advantageously shaped so as to enhance the tight engagement of the securement member 24 to the teat cup assembly. The outer diameter of the end of the upper portion of the sleeve member 19 adjacent to the attachment to the base of the cylindrical extension 20 has an outer diameter greater than the outer diameter of the main body portion of the sleeve member 19, so that the outer surface of the sleeve member 19 tapers inwardly in a direction from the end thereof to which the cylindrical extension is attached. Generally, the tapered portion is confined to no more than about an inch of the longitudinal length of the sleeve member 19 from the end to which cylindrical extension 20 is attached. The tapered portion of the sleeve member 19 is that end portion over which the securement member 24 is received. The securement member 24 must be expanded slightly to fit over the end of the sleeve member 19, and then fit tightly along the tapered portion, with the taper acting to actively restrain the securement member 24 in place.

In the preferred embodiment of the invention as illustrated, the action of the tapered portion of the end of the sleeve member 19 is further reinforced by providing an outwardly projecting, annular ring 26 (FIG. 2) which is integrally attached to the sleeve member 19 at the base of the cylindrical extension 20, i.e., at the end of the sleeve member 19 to which the cylindrical extension 20 is attached. The annular ring 26 preferably has a relatively sharp edged outer periphery which engages the inside surface of the securement member 24. The securement member 24 is expanded slightly over the annular ring 26 as shown, and the engagement with the annular ring 26 holds the securement member 24 tightly and securely in place.

In the preferred, illustrated embodiment of the invention, the means for connecting a vacuum milk line in flow communication with the inflation 16 comprises a cap member which is adapted to fit securely over the other end portion 16b of the tubular inflation member 16, so as to seal the turned back other end portion 16b of the inflation 16 tightly between the cap member and the shell 11. A nipple extends from the cap member for attachment of a vacuum milk line in flow communication with the inflation 16.

The cap member, as illustrated, compromises a hollow, substantially cylindrical section 27 adapted to fit over the other end portion 16b of the tubular inflation 16 in a telescopic manner. The cylindrical section 27 slides telescopically over the other end portion 16b, with the leading end of the cylindrical section 27 being adjacent to one end portion of the raised band 12. The trailing end portion of the cylindrical section 27 is positioned adjacent to the turned back edge of the other end portion 16b of the inflation. The trailing end of the cylindrical section 27 is preferably provided with a generally outwardly extending flange 28 to which an enlarged chamber 30 is attached. The cap member and the enlarged chamber 30 are preferably made of the same plastic material as the shell 11 and sleeve 19. The enlarged chamber 30, as illustrated, has an open upper end which is sealed to the flange 28 by an appropriate adhesive or sealing agent. The inner dimension of the enlarged chamber 30, in a direction substantially normal to the longitudinal axis of the inflation, is substantially greater than the cross-sectional dimension of the shell 11, so that the chamber 30 will have a volume at least equal to the volume of the inside of the inflation member 16. It has been found that unwanted pressure variations on the teat of the animal being milked can be substantially reduced and the vacuum at the end of the teat stabilized by providing the enlarged chamber 30, having at least the volume as specified. The stabilization of the vacuum at the teats of the animal being milked has been found to be effective in reducing occurrences of mastitis in the teats of the animals being milked. The effect of the stabilization of the vacuum at the teats of the animal being milked due to the enlarged chamber 30 is implemented by providing a small bleed orifice 31 (FIG. 2) through the side wall of the chamber 30. A nipple 32 extends from the chamber 30 for attachment of a vacuum milk line thereto.

Figure 2:
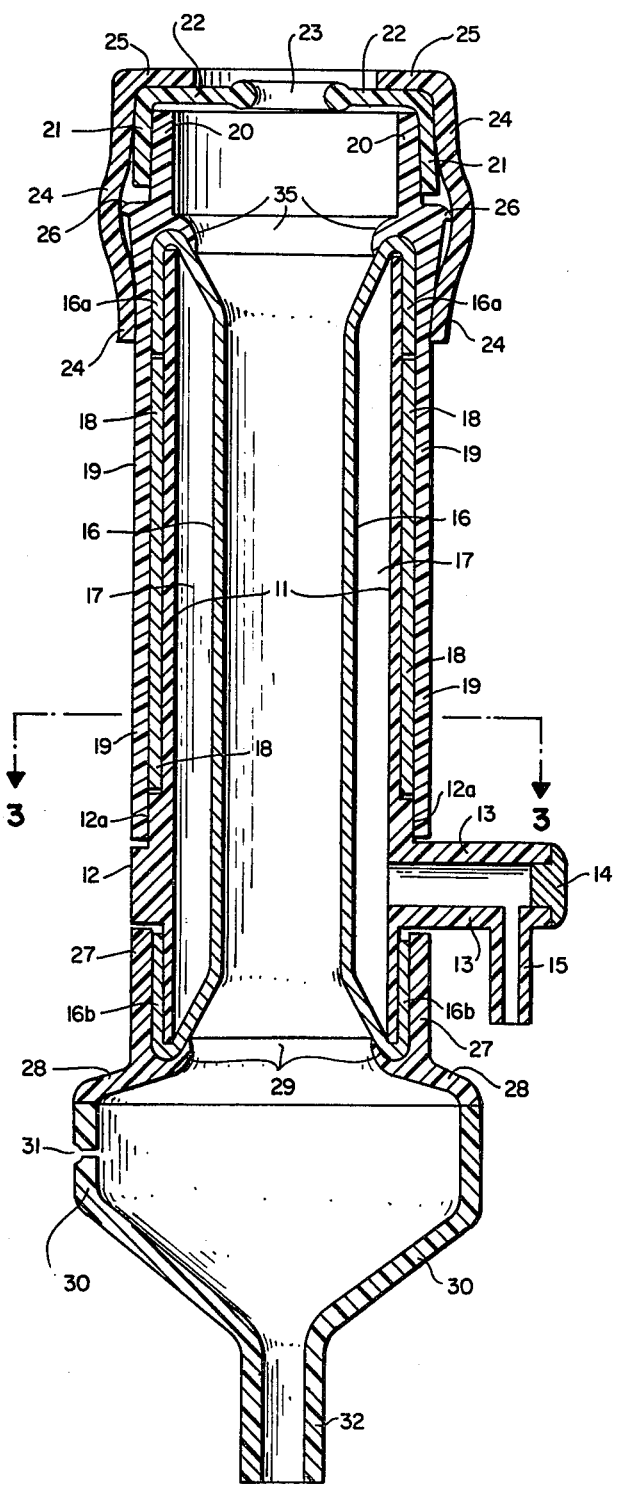
FIG. 2 is a longitudinal cross-sectional view through the assembled unit of FIG. 1.
Figure 5:
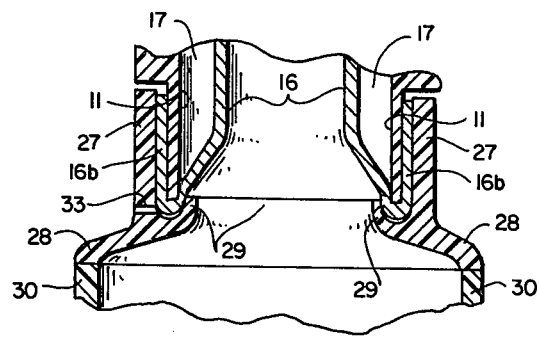
FIG. 5 is an enlarged, fragmentary, vertical cross section through the portion of the unit of FIG. 2 adjacent to the lower end of the inflation.

The cap member is preferably provided with a circular lip 29 projecting inwardly from the trailing end of the cylindrical section 27. The circular lip 29 extends inwardly and then curves toward the leading end of the cylindrical section 27 to form an open annular channel between the cylindrical section 27 and the lip 29. When the cylindrical section 27 of the cap member is fit over the other end portion 16b of the inflation 16, the turned back edge of the other end portion 16b is received into the open, annular channel as illustrated in FIGS. 2 and 5. The inner free edge of the lip 29 is spaced from the cylindrical section 27 such that it makes a substantially fluid tight seal with the inner surface of the inflation 16 as the inflation 16 enters the open, annular channel. A small orifice 33 (FIG. 5) is preferably bored in the cap member so as to communicate with the annular channel near the inwardly projecting portion of the lip 29. The orifice 33 allows air which would otherwise be trapped within the annular channel to be exhausted through the orifice 33 when the turned back edge of the other end portion 16b of the inflation 16 is received within the open, annular channel. The orifice 33 could be bored through the lip 29; however, it is preferable to bore the orifice 33 through the cylindrical section 27 as shown in FIG. 5, so that milk does not come into contact with the orifice 33.

The seal between the inner edge of the lip 29 and the inflation 16 has been found to be much easier to clean and sanitize than the larger crevice formed between the turned back edge of the inflation 16 and the cylindrical section 27 which would otherwise be exposed if no lip 29 were provided. The larger crevice provides a conducive habitat for bacterial growth when it is exposed to milk and the environment within the inflation, and unless scrupulous cleaning and sanitation practices are followed, the bacterial propegation can lead to spreading of mastitis infections among the animals being milked with the apparatus. The seal and juncture between the lip 29 and the inflation in accordance with the present invention completely isolates the crevice from the milk or the environment within the inflation and, thus, prevents bacterial growth and propegation within the crevice.

Figure 6:
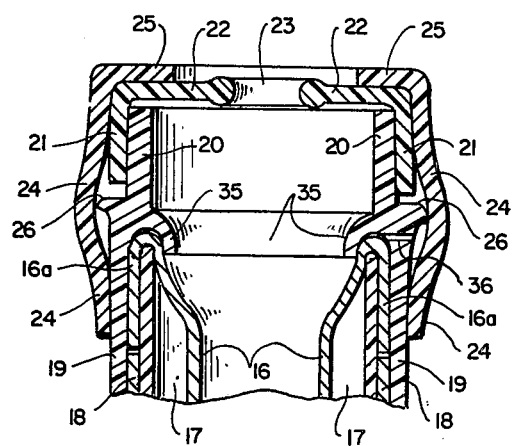
FIG. 6 is an enlarged, fragmentary, vertical cross section through the upper, teat entrance portion of the unit of FIG. 2.

A similar circular lip is preferably provided at the other end of the inflation 16 to isolate the crevice formed by the turned back portion of the inflation 16 at the other end thereof. As illustrated in FIGS. 2 and 6, a second circular lip 35 preferably projects inwardly from the other end portion of the elongate sleeve 19, i.e., from the end of the sleeve 19 to which the cylindrical extension 20 is attached. The lip 35 projects inwardly from the end of the sleeve 19 at the base of the cylindrical extension 20 and then curves toward the leading end of the sleeve 19. The lip 35 forms a second, open, annular channel between the sleeve 19 and the lip 35 which is similar to the first annular channel formed by the lip 29 at the opposite end of the inflation 16. When the sleeve member 19 is in its telescoped position over the shell 11, the turned back edge of the one end portion 16a of the inflation 16 is received into the second, open, annular channel. The free inner edge of the lip 35 is spaced from the inner wall of the sleeve 19 such that it makes a substantially fluid-tight seal with the inner surface of the inflation 16 as the inflation 16 enters the second open, annular channel.

A small hole 36 (FIG. 6) is preferably bored through the sleeve 19 so as to communicate with the second annular channel near the inwardly projecting portion of the lip 35. The hole 36 allows air which would otherwise be trapped within the second annular channel to be exhausted through the hole 36 when the turned back edge of the one end portion 16a of the inflation 16 is received within the second, open, annular channel. The hole 36 could be bored through the lip 35; however, it is preferable to bore the hole 36 through the wall of the sleeve 19 as shown in FIG. 6, so that milk can not come in contact with the hole 36.

Although a preferred embodiment of my invention has been herein disclosed and illustrated, it is to be understood that the present disclosure is made by way of example and that various modifications are possible without departing from the subject matter coming within the scope of the following claims, which subject matter I regard as my invention.

I claim:

1. A teat cup assembly for an automatic milking machine which employs a milk line operating at substantially constant vacuum and a source of pulsating vacuum, said teat cup assembly comprising:

a rigid, tubular shell molded from a plastic material, said shell having first and second open ends, said shell further having a raised band which is affixed to the shell and encircles the outer circumference of said shell, said raised band being spaced along the longitudinal length of said shell from at least the first open end of said shell, said shell further having a port therein through said raised band, with said port being adapted to be connected to a source of pulsating vacuum;

an elongate, tubular inflation member made of a resilient, flexible, elastomeric material, said inflation being adapted to be received longitudinally within said shell;

means for interconnecting opposite end portions of said tubular inflation member to respective ends of said shell, whereby an enclosed, pulsating vacuum chamber is defined between said inflation and said shell;

a sheet of metal formed to wrap around and conform closely to the outer surface of said shell, said metal sheet being positioned between said raised band and said first open end of said shell;

an elongate sleeve member adapted to slide over the shell and the sheet of metal in telescopic manner, with the leading end of said sleeve being adapted to make a tight, compression fit over the periphery of at least the end portion of said raised band;

means for sealing the other end portion of said sleeve member to said shell;

teat entrance means associated with one of the opposite end portions of said inflation for receiving a teat of an animal to be milked within said inflation; and means associated with the other end portion of said inflation for connecting a vacuum milk line in flow communication with said inflation.

2. A teat cup assembly for automatic milking machines which employ a milk line operating at substantially constant vacuum and a source of pulsating vacuum, said teat cup assembly comprising:

a rigid, tubular shell molded from a plastic material, said shell having first and second open ends, said shell further having a raised band which is affixed to the shell and encircles the outer circumference of said shell, said raised band being spaced along the longitudinal length of said shell from at least the first open end of said shell, said shell further having a port therein through said raised band, with said port being adapted to be connected to a source of pulsating vacuum;

an elongate, tubular inflation member made of a resilient, flexible, elastomeric material, said inflation being adapted to be received longitudinally within said shell, with the inflation being of sufficient length to extend beyond the respective first and second open ends of said shell and with the opposite end portions of said inflation being expanded and turned back over the respective first and second open ends of said shell, whereby a pulsating vacuum chamber is defined between said inflation and said shell;

a sheet of metal formed to wrap around and conform closely to the outer surface of said shell, said metal sheet being positioned between said raised band and the one end portion of said tubular inflation member which is turned back over the first open end of said shell;

an elongate sleeve member adapted to slide over the shell and the sheet of metal in telescopic manner, with the leading end of said sleeve being adapted to make a tight, compression fit over the periphery of at least the end portion of said raised band, and with the other end portion of said sleeve member being adapted to fit securely over said one end portion of said tubular inflation which is turned back over said first open end of said shell, so that said one end portion of said inflation is sealed tightly between said sleeve member and said shell;

a cap member adapted to fit securely over the other end portion of said tubular inflation member which is turned back over said second open end of said shell, whereby said other end portion of said inflation is sealed tightly between said cap member and said shell;

teat entrance means associated with one of the opposite end portions of said inflation for receiving a teat of an animal to be milked within said inflation; and means associated with the other end portion of said inflation for connecting a vacuum milk line in flow communication with said inflation.

3. A teat cup assembly in accordance with claim 2, wherein said raised band is made of the same plastic material as said shell and is integrally molded to said shell.

4. A teat cup assembly in accordance with claim 3, wherein said raised band is formed with one end portion thereof having a greater thickness than the other end portion thereof, so as to form a protruding abutment encircling said raised band separating said one end portion of said raised band from said other end portion thereof;

said raised band is positioned along the longitudinal length of said shell between the two open ends of said shell so as to be spaced closer to said second open end than said first open end, with said one end portion of said band which has the greater thickness being more remote from said first open end of said shell than said other end portion of said raised band, such that said protruding abutment faces toward said first open end of said shell;

said leading end of said sleeve member makes a tight, compression fit over said other end portion of said raised band, with the end face of said leading end of said sleeve being adjacent to said protruding abutment of said raised band;

said teat entrance means comprises a cylindrical extension integrally molded to said other end portion of said elongate sleeve so as to extend coaxially outwardly from said first open end of said shell when said elongate sleeve is in its telescoped position over said shell; a cup-like, teat entrance member made of a resilient, flexible elastomeric material, said cup-like teat entrance member comprising a substantially cylindrical side section and a diaphragm having a central opening therein molded integrally to one end of said cylindrical side section, said cylindrical side section of said teat entrance member being adapted to fit over said cylindrical extension on said elongate sleeve so that when the teat entrance member is positioned on said cylindrical extension, said diaphragm extends across the otherwise open end of said cylindrical extension and the opening in said diaphragm is located substantially coaxial with the longitudinal axis of said inflation member which is positioned within said shell; and a substantially cylindrical, securement member which is adapted to slide substantially tightly over said teat entrance member and cylindrical extension to securely hold said teat entrance member in place and to provide protection for the elastomeric teat entrance member; and said means for connecting a vacuum milk line in flow communication with said inflation comprising a nipple extending from said cap member.

5. A teat cup assembly in accordance with claim 4, wherein an outwardly projecting, annular ring is integrally attached to said elongate sleeve at the base of said cylindrical extension, whereby said securement member is expanded slightly over said annular ring and held tightly and securely in place.

6. A teat cup assembly in accordance with claim 5, wherein said annular ring is molded integrally to said elongate sleeve, and said annular ring has a relatively sharp edged outer periphery which engages the inside surface of said securement member.

7. A teat cup assembly in accordance with claim 4, wherein said cap member slides telescopically over said other end portion of said inflation, with the leading end of said cap member being adjacent to said one end portion of said raised band.

8. A teat cup assembly in accordance with claim 4, wherein said cap member comprises a hollow, substantially cylindrical section adapted to fit over the other end portion of said tubular inflation member in a telescopic manner so that the trailing end of said cylindrical section is adjacent to the turned back edge of said other end portion of said inflation at said second open end of said shell; and a circular lip projects inwardly from said trailing end of said cylindrical section and then curves toward said leading end of said cylindrical section to form an open annular channel between said cylindrical section and said lip, whereby when said cap member is fit over said other end portion of said inflation, the turned back edge of said other end portion of said inflation at said second open end of said shell is received into said open, annular channel, with the inner free edge of said lip making a substantially fluid tight seal with the inner surface of said inflation.

9. A teat cup assembly in accordance with claim 8, wherein a small orifice is bored in the cap member so as to communicate with said annular channel near the inwardly projecting portion of said lip so that as the turned back edge of said other end portion of said inflation is received within said open annular channel, air trapped within the annular channel is exhausted through said small orifice.

10. A teat cup assembly in accordance with claim 9 wherein said small orifice is bored through said cylindrical section of said cap member.

11. A teat cup assembly in accordance with claim 8, wherein said cap member further includes an enlarged chamber attached to the trailing end of said cylindrical section, with the inner dimension of said enlarged chamber in a direction substantially normal to the longitudinal axis of said inflation being substantially greater than the cross-sectional dimension of said shell so that said chamber will have a volume at least about equal to the volume of the inside of the elongate inflation member, and said chamber has a nipple extending therefrom for connecting a vacuum milk line in flow communication with said chamber.

12. A teat cup assembly in accordance with claim 11, wherein a small bleed orifice is bored through the side wall of said enlarged chamber.

13. A teat cup assembly in accordance with claim 8, wherein a second circular lip projects inwardly from said other end portion of said elongate sleeve and then curves toward said leading end of said elongate sleeve to form a second, open, annular channel between said sleeve and said second lip, whereby when said elongate sleeve member is in its telescoped position over said shell, the turned back edge of said one end portion of said inflation at said first open end of said shell is received into said second, open, annular channel, with the inner free edge of said second lip making a substantially fluid tight seal with the inner surface of said inflation.

14. A teat cup assembly in accordance with claim 13, wherein a small hole is bored through said elongate sleeve so as to communicate with said second annular channel near the inwardly projecting portion of said second lip so that as the turned back edge of said one end portion of said inflation is received within said second open annular channel, air trapped within the second annular channel is exhausted through said small hole.

15. A teat cup assembly in accordance with claim 2, wherein said cap member comprises a hollow, substantially cylindrical section adapted to fit over the other end portion of said tubular inflation member in a telescopic manner so that the trailing end of said cylindrical section is adjacent to the turned back edge of said other end portion of said inflation at said second open end of said shell; and a circular lip projects inwardly from said trailing end of said cylindrical section and then curves toward said leading end of said cylindrical section to form an open annular channel between said cylindrical section and said lip, whereby when said cap member is fit over said other end portion of said inflation, the turned back edge of said other end portion of said inflation at said second open end of said shell is received into said open, annular channel, with the inner free edge of said lip making a substantially fluid tight seal with the inner surface of said inflation.

16. A teat cup assembly in accordance with the claim 15, wherein a second circular lip projects inwardly from said other end portion of said elongate sleeve and then curves toward said leading end of said elongate sleeve member to form a second open annular channel between said sleeve and said second lip, whereby when said elongate sleeve member is in its telescoped position over said shell, the turned back edge of said one end portion of said inflation at said first open end of said shell is received into said second open annular channel, with the inner free edge of said second lip making a substantially fluid tight seal with the inner surface of said inflation.

* * * * *